United States Patent
Zhao et al.

(10) Patent No.: US 11,643,740 B2
(45) Date of Patent: May 9, 2023

(54) TRIMETALLIC LAYERED DOUBLE HYDROXIDE COMPOSITION

(71) Applicants: NEWSOUTH INNOVATIONS PTY LIMITED, Sydney (AU); KOHODO HYDROGEN ENERGY PTY LTD, Sydney (AU)

(72) Inventors: Chuan Zhao, Randwick (AU); Xin Bo, Kingsford (AU)

(73) Assignees: NEWSOUTH INNOVATIONS PTY LIMITED, Sydney (AU); KOHODO HYDROGEN ENERGY PTY LTD, Sydney (AU)

(*) Notice: Subject to any disclaimer, the term of this patent is extended or adjusted under 35 U.S.C. 154(b) by 0 days.

(21) Appl. No.: 17/268,424

(22) PCT Filed: Aug. 16, 2019

(86) PCT No.: PCT/AU2019/050859
§ 371 (c)(1),
(2) Date: Feb. 12, 2021

(87) PCT Pub. No.: WO2020/034007
PCT Pub. Date: Feb. 20, 2020

(65) Prior Publication Data
US 2021/0348284 A1    Nov. 11, 2021

(30) Foreign Application Priority Data
Aug. 16, 2018  (AU) ................................ 2018903001

(51) Int. Cl.
C25B 11/075    (2021.01)
B01J 35/00     (2006.01)
(Continued)

(52) U.S. Cl.
CPC .......... C25B 11/075 (2021.01); B01J 23/866 (2013.01); B01J 35/002 (2013.01); C01G 51/006 (2013.01);
(Continued)

(58) Field of Classification Search
CPC ... B25B 11/075; C25B 11/061; C25B 11/052; B01J 23/866; B01J 35/022; C01G 51/006; C22B 1/04; C01P 2002/22
See application file for complete search history.

(56) References Cited

FOREIGN PATENT DOCUMENTS

CN    108910962 A  *  11/2018
CN    108910962 A     11/2018

OTHER PUBLICATIONS

PCT International Search Report and Written Opinion for PCT/AU2019/050859, dated Oct. 25, 2019, 11 pages.
(Continued)

*Primary Examiner* — Melissa S Swain
(74) *Attorney, Agent, or Firm* — Eric D. Babych; Barnes & Thornburg LLP

(57) ABSTRACT

The invention relates to a layered double hydroxide (LDH) material and methods for using the LDH material to catalyse the oxygen evolution reaction (OER) in a water-splitting process. The invention also provides a composition, a catalytic material, an electrode and an electrolyser including the LDH material. In particular, the LDH material includes a metal composite including cobalt, iron, chromium and optionally nickel species interspersed with a hydroxide layer.

20 Claims, 13 Drawing Sheets

(51) Int. Cl.
*C25B 11/061* (2021.01)
*C25B 11/052* (2021.01)
*C25B 1/04* (2021.01)
*C01G 51/00* (2006.01)
*B01J 23/86* (2006.01)

(52) U.S. Cl.
CPC .............. *C25B 1/04* (2013.01); *C25B 11/052* (2021.01); *C25B 11/061* (2021.01); *C01P 2002/22* (2013.01)

(56) References Cited

OTHER PUBLICATIONS

Bo, Xin et al. "High valence chromium regulated cobalt-iron-hydroxide for enhanced water oxidation," Journal of Power Sources (2018) 402, 381-387.

Bo, Xin et al. "NiFeCr Hydroxide Holey Nanosheet as Advanced Electrocatalyst for Water Oxidation," ACS Applied Materials & Interfaces (2017) 9, 41239-41245.

Burke, Michaela S. et al. "Cobalt-Iron (Oxy)hydroxide Oxygen Evolution Electrocatalysts: The Role of Structure and Composition on Activity, Stability, and Mechanism," Journal of the American Chemical Society (2015) 137, 3638-3648.

Dong, Chenlong et al. "Rational design of cobalt-chromium layered double hydroxide as a highly efficient electrocatalyst for water oxidation," Journal of Materials Chemistry A (2016) 4, 11292-11298.

Gao, Taotao et al. "A trimetallic V—Co—Fe oxide nanoparticle as an efficient and stable electrocatalyst for oxygen evolution reaction," Journal of Materials Chemistry A (2013) 00, 1-3, 1-8.

Li, Zhenhua et al. "Fast electrosynthesis of Fe-containing layered double hydroxide arrays toward highly efficient electrocatalytic oxidation reactions," Chemical Science (2015) 6, 6624-6631.

Hadi, Jebril et al., "A novel and easy chemical-clock synthesis of nanocrystalline iron-cobalt bearing layered double hydroxides," Journal of Colloid and Interface Science, Jul. 30, 2014, 434, pp. 130-140.

Lin, Hong et al., "Cobalt-based layered double hydroxides as oxygen evolving electrocatalysts in neutral electrolyte," Frontiers of Materials Science, Apr. 19, 2012, 6(2), pp. 142-148.

Wen, Lulu et al., "Cr-Dopant Induced Breaking of Scaling Relations in CoFe Layered Double Hydroxides for Improvement of Oxygen Evolution Reaction," Small, Jul. 15, 2019, 15(35), pp. 1-9.

\* cited by examiner

US 11,643,740 B2

TRIMETALLIC LAYERED DOUBLE HYDROXIDE COMPOSITION

FIELD OF THE INVENTION

The invention relates to a layered double hydroxide (LDH) material and methods for using the LDH material to catalyse the oxygen evolution reaction (OER) in a water-splitting process. The invention also provides a composition, a catalytic material, an electrode and an electrolyser comprising the LDH material.

BACKGROUND

Water-splitting processes are considered a sustainable approach to hydrogen generation and storage as they can exploit the abundance of available water and low carbon intensive energy source, such as a renewable source of energy (e.g. solar energy), as inputs. Water-splitting may be carried out in an electrolyser generating hydrogen at the cathode via the hydrogen evolution reaction (HER). Oxygen may be generated at the anode via the oxygen evolution reaction (OER).

In practice, water splitting is typically performed in strong alkaline electrolyte as most of the transitional metal-based electrodes cannot survive in strong acid conditions due to instability. The performance of water-splitting catalysts is limited by the relatively sluggish kinetics of the OER half reaction. OER involves a four-electron-transfer process. Therefore, besides the theoretically defined electrolysis potential value of 1.23 V, extra energy input is required to enable the decomposition of water molecules. This additional energy requirement is referred to as an overpotential ($\eta$) as a greater than theoretical potential is required to drive the electrolysis reaction.

Although noble-metal-based materials such as $IrO_2$ and $RuO_2$ can efficiently oxidize water into oxygen within an acceptable overpotential range, the industrial application for water splitting is still hindered by the high cost of such noble metals.

Recent efforts have focussed on developing water-splitting catalysts based on Earth-abundant metals. Earth-abundant metals exclude Re, Ru, Os, Rh, Ir, Pd, Pt, Ag and Au. One promising class of Earth-abundant metal-based electrocatalysts are the layered double hydroxides (LDHs). Typically, LDHs consist of positively charged layers of a metal containing species interspersed with negatively charged anions in the interspacial region(s). One example of an LDH is a Ni—Fe LDH, which comprises $Ni^{2+}$ and $Fe^{3+}$ cations interspersed with counter anions. Ni—Fe LDHs have been shown to be efficient OER catalysts under alkaline conditions. However, the complex structure of Ni—Fe LDHs means that the catalytic site and mechanism of action are poorly understood, making their further development as electrocatalysts more difficult.

Hence, there is a continuing need to further develop catalytic materials made of earth abundant element(s).

SUMMARY OF THE INVENTION

The inventors have developed a ternary composite material comprising cobalt, iron and chromium interspersed with a hydroxide layer that is able to catalyse OER with low overpotentials ($\eta$). Surprisingly, the OER catalytic performance of the CoFeCr composites are superior to those achieved for composites comprising cobalt and iron without chromium.

In one aspect, the invention provides a layered double hydroxide (LDH) material comprising a metal composite comprising cobalt, iron and chromium species interspersed with a hydroxide layer.

In another aspect, the invention provides a catalytic material comprising the LDH material of the invention.

In a further aspect, the invention provides an electrode comprising a conductive substrate and a catalytic material coated onto a surface of the conductive substrate, the catalytic material comprising the LDH material of the invention.

In a still further aspect, the invention provides a method of evolving oxygen from water splitting, the method comprising providing an electrochemical cell comprising an anode, a cathode, an electrolyte solution and optionally a reference electrode, contacting water with the anode and the cathode, and applying a voltage across the anode and the cathode, wherein the anode comprises the layered double hydroxide material of the invention.

In another aspect, the invention provides an electrolyser comprising an anode, a cathode, a power supply and optionally a reference electrode, wherein the anode comprises the LDH material of the invention.

In a further aspect, the invention provides a process for preparing the catalytic material or the electrode of the invention, the process comprising contacting a conductive substrate with a solution comprising cobalt, iron and chromium ions, and applying a voltage across the substrate and a counter electrode through the solution to electrodeposit a composite material comprising cobalt, iron and chromium species on the substrate.

In yet another aspect, the invention provides a process for preparing the catalytic material comprising treating a mixture of cobalt ions, iron ions and chromium ions to a temperature between 150° C. to 220° C. for 8 to 20 hours, cooling the mixture and collecting the product.

Before describing the present invention in detail, it is to be understood that this invention is not limited to particularly exemplified embodiments, methods of production or use, which may, of course, vary.

The inventions described and claimed herein have many attributes and embodiments including, but not limited to, those set forth or described or referenced in this summary section, which is not intended to be all-inclusive. The inventions described and claimed herein are not limited to or by the features or embodiments identified in this summary section, which is included for purposes of overview illustration only and not limitation.

All publications, patents and patent applications cited herein, whether supra or infra, are hereby incorporated by reference in their entirety.

It is to be understood that, if any prior art publication is referred to herein, such reference does not constitute an admission that the publication forms a part of the common general knowledge in the art.

BRIEF DESCRIPTION OF DRAWING(S)

The present application will be further described, by way of example only, with reference to the accompanying drawings, in which:

FIGS. 1a-d show (a) scanning electron microscopy (SEM) images of a microsphere morphology of CoFeCr composites on a nickel foam (NF) substrate, with a magnified image shown in the insert; (b) transmission electron tomography (TEM) images of the CoFeCr composites with lattice fringes shown in the inserts, (c) selected area electron diffraction (SAED) patterns; and (d) images showing elemental distribution (O [upper left], Co [upper right], Fe [lower left]; Cr [lower right]) of CoFeCr composites.

FIGS. 4a-h show a series of SEM images of the CoFe composites on NF under different depositing time: (a) 30 seconds ("s"); (b) 60 s; (c) 120 s; (d) 300 s; (e) 900 s; (f) 1800 s; (g) 3600 s; (h) 7200 s.

FIGS. 5a-h show a series of SEM images of the CoFeCr composites on NF under different depositing time. (a) 30 s; (b) 60 s; (c) 120 s; (d) 300 s; (e) 900 s; (f) 1800 s; (g) 3600 s; (h) 7200 S.

Figure 6:
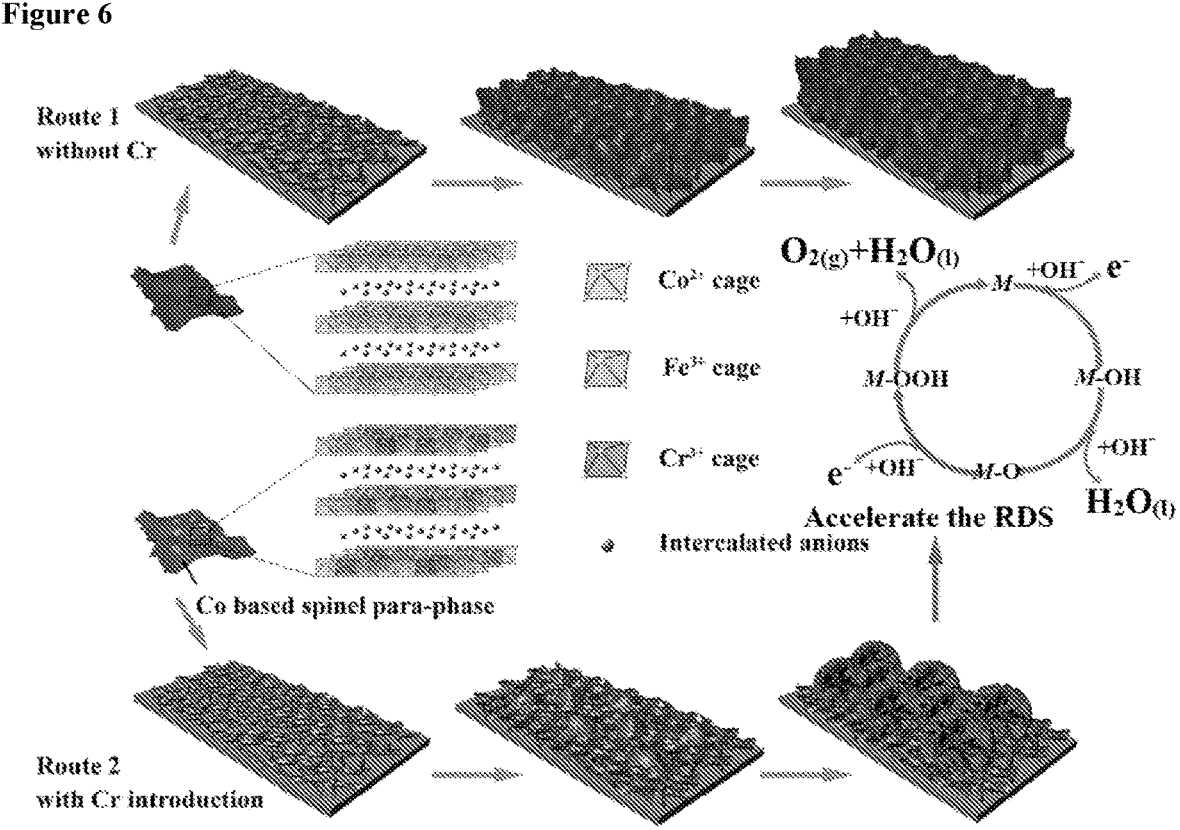

FIG. 6 shows a schematic image comparing the growth of the CoFe nanosheet and CoFeCr microsphere composites.

Figure 7:
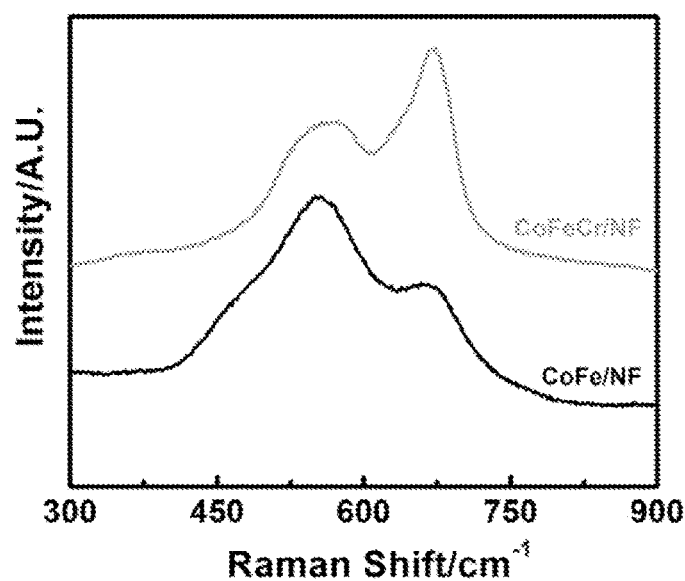

FIG. 7 shows Raman spectra of CoFeCr composite (upper) and CoFe (lower) composite on NF.

FIGS. 8a-d show X-ray photoelectron spectroscopy (XPS) spectra of (a) O1s, (b) Co2p, (c) Fe2p, (d) Cr2p of a CoFeCr composite electrode before (upper) and after (lower) OER testing in 1 M KOH.

Figure 9:
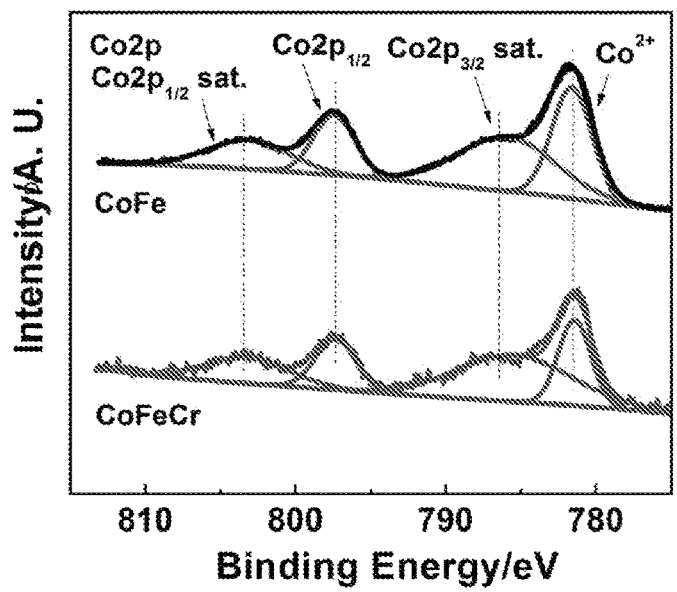

FIG. 9 shows Co2p XPS spectra of fresh CoFe (upper) and CoFeCr (lower) composites on NF.

Figure 10:
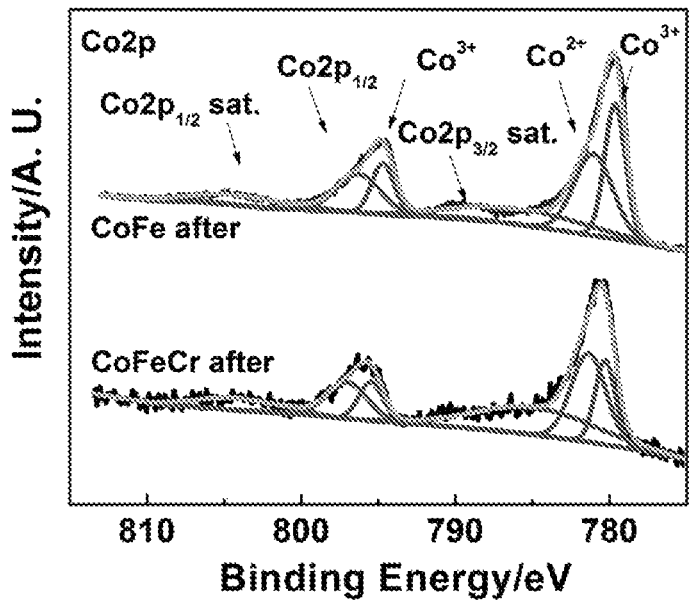
Figure 11:
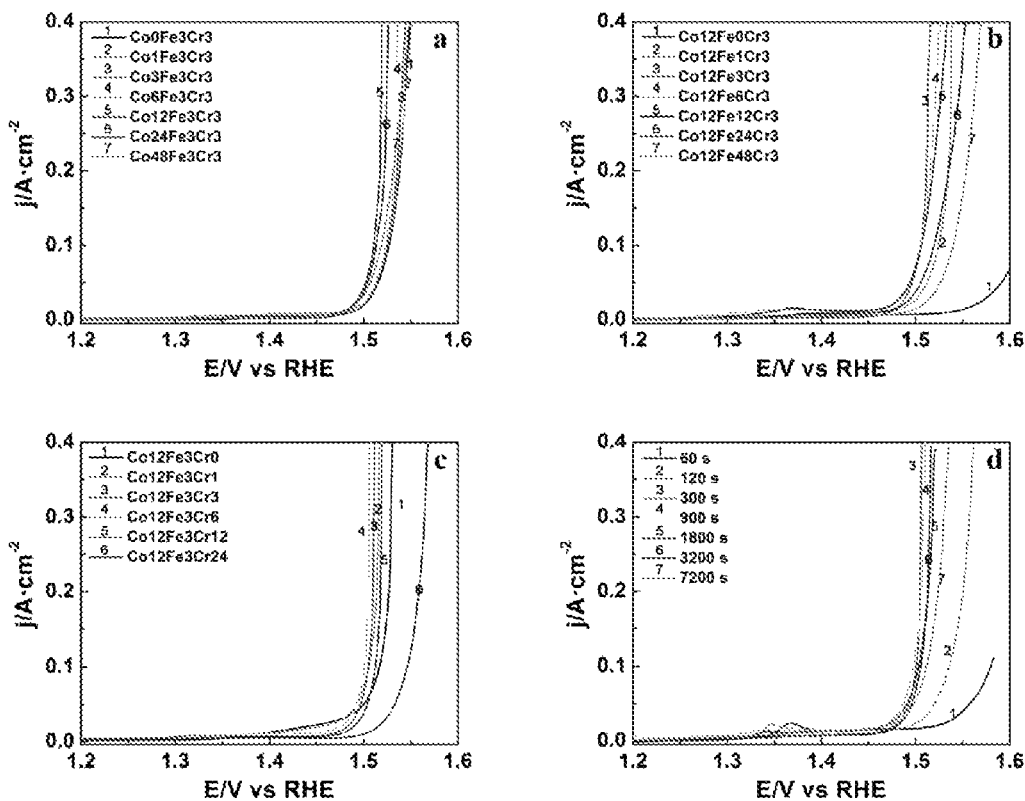

FIG. 10 shows XPS spectra of Co2p on CoFe (upper) and CoFeCr (lower) composites after OER testing in 1 M KOH.

FIGS. 11a-d show linear sweep voltametry (LSV) charts showing OER performance of various LDH materials in 1 M KOH electrolyte at the scanning rate of 5 $mV \cdot s^{-1}$ with 95% iR compensation of CoFeCr composite on NF synthesized from different precursor additions of (a) $Co^{2+}$: 0 mM to 48 mM, (b) $Fe^{3+}$: 0 mM to 48 mM, (c) $Cr^{3+}$: 0 mM to 24 mM and (d) varying depositing time: from 60 s to 7200 s in 12 mM $Co^{2+}$, 3 mM $Fe^{3+}$ and 6 mM $Cr^{3+}$ FIGS. 12a-d show (a) LSV curves for various OER catalysis at the scanning rate of 5.0 $mV \cdot s^{-1}$ with 95% iR compensation in 1 M KOH electrolyte; (b) LSV curves of OER performance of CoFeCr composite at the scanning rate of 5.0 $mV \cdot s^{-1}$ with 95% iR compensation before (black) and after (red) long-term durability testing with an insert showing a chart of the chronopotentiometry under current density of 100 $mA \cdot cm^{-2}$ for 24 hours without iR compensation in 1 M KOH electrolyte; (c) LSV curve for the CoFeCr composite at the scanning rate of 0.1 $mV \cdot s^{-1}$ with 95% iR compensation in 1 M KOH electrolyte with an insert showing the derived Tafel Slope simulation; (d) electrochemical impedance spectroscope (EIS) plots of CoFeCr (grey) and CoFe (black) composites on NF in 1 M KOH electrolyte at the applied potential of 1.48 V vs RHE without iR compensation: Circles: measured plots; Curves: calculated results.

FIGS. 13a-f show Cyclic voltammetries in 1 M KOH electrolyte under various scanning rates and the relevant calculation of electrochemical surface areas (a and b: NF; c and d: CoFe/NF; e and f: CoFeCr/NF).

Figure 14:
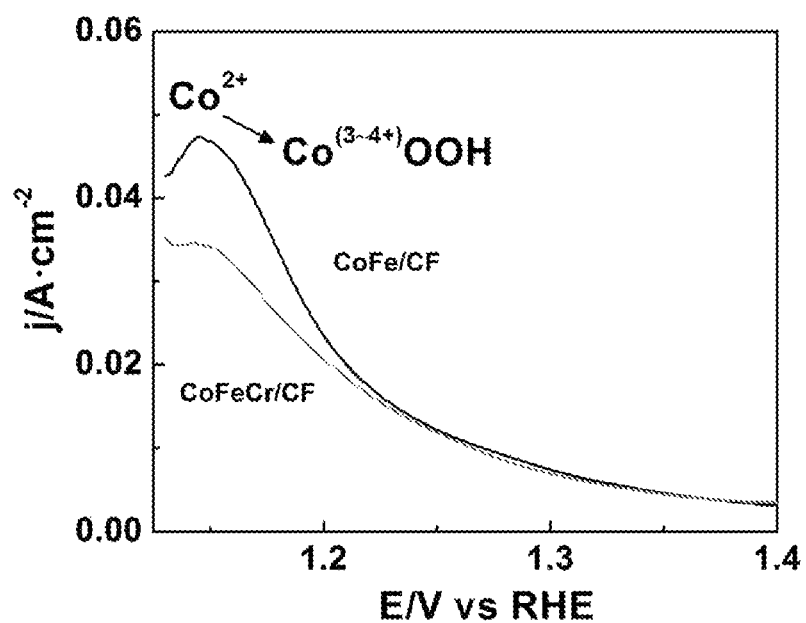

FIG. 14 shows a LSV curve before OER (very first scan following electrodeposition) of CoFe (upper) and CoFeCr (lower) composites on copper foam (CF) in 1 M KOH electrolyte at the scanning rate of 5.0 mV $s^{-1}$ without iR compensation.

Figure 15:
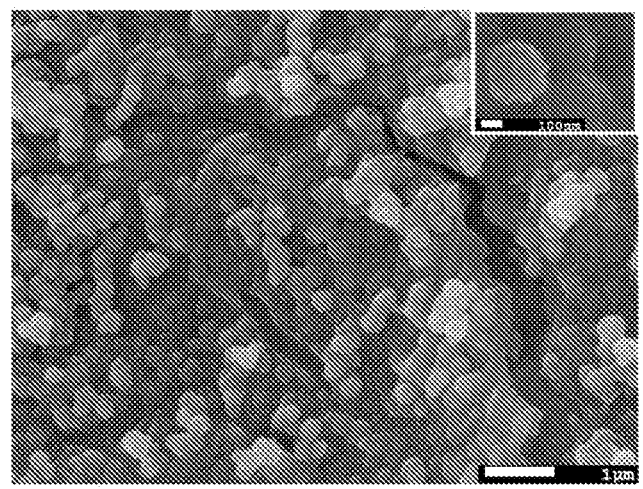

FIG. 15 shows SEM images of as-prepared CoFeCr composites on NF after long-term OER testing in 1 M KOH with an insert showing a magnified SEM image.

Figure 16:
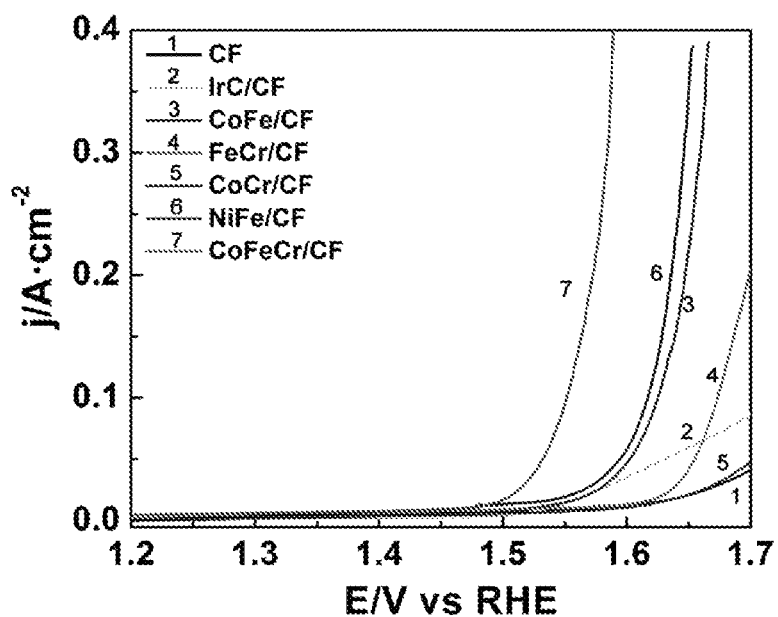

FIG. 16 shows a series of LSV curves comparing the OER performance of various catalysts on copper foam (CF) substrates.

Figure 17:
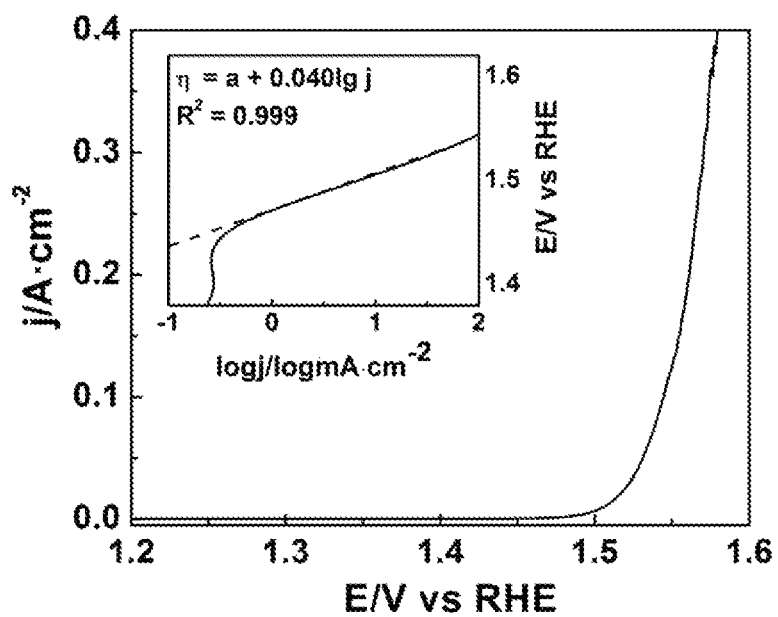

FIG. 17 shows a LSV curve of the CoFe composite on NF substrate at the scanning rate of 0.1 $mV \cdot s^{-1}$ with 95% iR compensation with an insert showing a derived Tafel Slope simulation.

Figure 18:
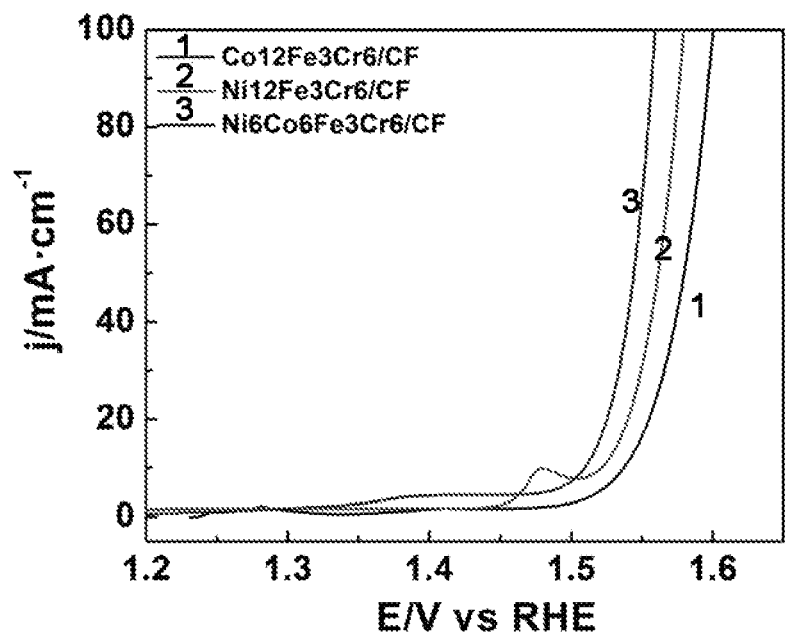

FIG. 18 shows a LSV curve of a NiCoFeCr composite LDH on a CF substrate in 1 M KOH with 90% iR compensation compared to CoFeCr composite LDH or NiFeCr composite on CF substrate.

Figure 19:
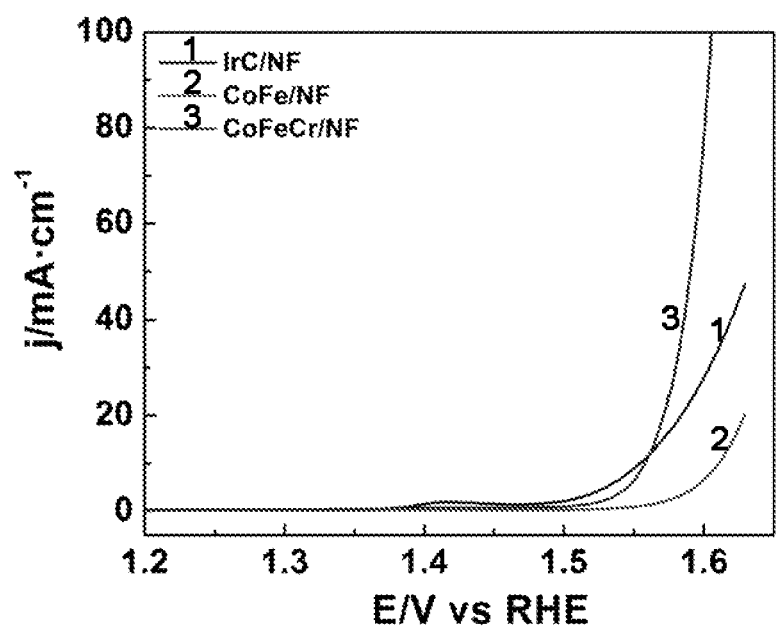

FIG. 19 shows a LSV curve of a CoFeCr composite LDH nanodot on a NF substrate in 1 M KOH without iR compensation compared to a binary CoFe composite catalyst and a commercial IrC catalyst.

Figure 20:
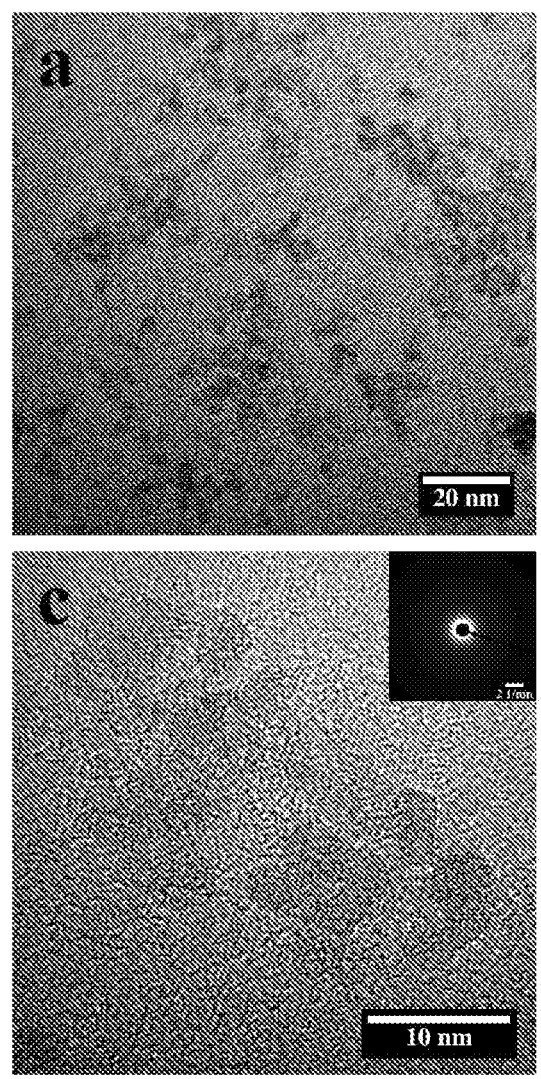

FIG. 20 provides TEM images of CoFeCr LDH nanodots at 20 nm (a) and 10 nm (c).

DEFINITIONS

As used herein, the term "water-splitting" relates to any process that generates elemental hydrogen or oxygen from water as the starting material. The water-splitting processes described herein are electrolytic in nature. These electrolytic processes typically involve the hydrogen evolution reaction (HER) at the cathode and the oxygen evolution reaction (OER) at the anode.

As used herein, the term "oxygen scavenger" relates to any material capable of inhibiting oxidation of a catalytic centre.

As used herein and in the appended claims, the singular forms "a," "an," and "the" include plural reference(s) unless the context clearly dictates otherwise. Thus, for example, a reference to "a surface" may include a plurality of surfaces or may be a reference to one or more surfaces, and so forth.

Unless defined otherwise, all technical and scientific terms used herein have the same meanings as commonly understood by one of ordinary skill in the art to which this invention belongs. It will be appreciated that any materials and methods similar or equivalent to those described herein can be used to practice or test the invention; the best-known embodiments of the various materials and methods are described.

The term "(s)" following a noun contemplates the singular or plural form, or both.

The term "and/or" can mean "and" or "or".

Unless the context requires otherwise, all percentages referred to herein are percentages by weight of the material.

Various features of the invention are described with reference to a certain value, or range of values. These values are intended to relate to the results of the various appropriate measurement techniques, and therefore should be interpreted as including a margin of error inherent in any particular measurement technique. Some of the values referred to herein are denoted by the term "about" to at least in part account for this variability. The term "about", when used to describe a value, may mean an amount within +25%, 10%, 5%, ±1% or ±0.1% of that value.

The term "comprising" (or variations such as "comprise" or "comprises") as used in this specification, except where the context requires otherwise due to express language or necessary implication, is used in an inclusive sense, i.e. to specify the presence of the stated features but not to preclude the presence or addition of further features in various embodiments of the invention.

DESCRIPTION OF EMBODIMENT(S)

The invention provides a layered double hydroxide material comprising a metal composite comprising cobalt, iron and chromium species.

Advantageously, the LDH materials of the invention demonstrate surprisingly improved OER catalytic activity compared with LDH materials comprising cobalt and iron composites. Without wishing to be bound by theory, it is believed that the inclusion of chromium in the metal composite acts as an oxidation scavenger for the cobalt ions, which serve as the catalytic site for OER. The results for the CoFeCr LDH materials suggest that the chromium and iron species work synergistically to retain the cobalt in the composite in a catalytically active form.

The LDH materials comprise a metal composite comprising cobalt, iron and chromium species. In some embodiments, the metal composite is a ternary composite material (TCM) consisting essentially of cobalt, iron and chromium. These ternary composite materials may comprise trace amounts of contaminating metals, such as Ni, Cu or other transition metal impurities. Trace amounts typically refer to amounts of up to 0.01 wt % of the composite.

In some embodiments, the metal composite may comprise one or more further metal species in addition to cobalt, iron and chromium. The further metal species may be a further species capable of catalyzing OER, or may be a further metal species capable of serving as an oxidation scavenger. In some embodiments, the one or more further metal species is nickel. In this embodiment, the metal composite is a quaternary composite comprising cobalt, iron, chromium and nickel.

The cobalt species is typically a cationic species, such as $Co^{2+}$ and/or $Co^{3+}$.

The iron species is typically a cationic species, such as $Fe^{2+}$ and/or $Fe^{3+}$.

The chromium is typically a cationic species, such as $Cr^{3+}$ and/or $Cr^{6+}$.

When present in a quaternary complex, the nickel is typically a cationic species such as $Ni^{2+}$ and/or $Ni^{3+}$.

The inventors found that upon formation of the CoFeCr LDH materials by electrolytic deposition the composite comprises chromium in the +3 oxidation state. Following OER catalysis, the CoFeCr LDH materials comprise chromium in the +3 and the +6 oxidation states. It is believed that the $Cr^{3+}$ is sacrificially oxidized to assist in retaining the cobalt species in a catalytically active form. It is also believed that the $Cr^{6+}$ serves as an oxygen scavenger further assisting in retaining the cobalt species in a catalytically active form.

The concentration of each of the species present in the metal composite may be determined by inductively coupled plasma optical emission spectrometry (ICP-OES).

The cobalt content in the metal composites can be measured by dissolving the electrode in 0.5 M $H_2SO_4$ for ICP-OES testing. The metal composites may comprise cobalt in a concentration of about 0.0001 to about 24 mmol/L, especially about 0.001 to about 10 mmol/L, for example from about 0.01 mmol/L to about 0.06 mmol/L, or from about 0.015 mmol/L to about 0.05 mmol/L or about 0.03 mmol/L to about 0.05 mmol/L. The cobalt concentration may be substantially unchanged following oxidation.

The iron content in the metal composites can be measured by dissolving the electrode in 0.5 M $H_2SO_4$ for ICP-OES testing. The metal composites may comprise iron in a concentration of about 0.0001 mmol/L to about 24 mmol/L, especially about 0.001 to about 10 mmol/L, for example from about 0.005 mmol/L to about 3 mmol/L or 0.005 mmol/L to about 0.06 mmol/L, or from about 0.015 mmol/L to about 0.05 mmol/L or about 0.03 mmol/L to about 0.04 mmol/L. Following use as an OER catalyst, the iron concentration may be lower than the iron concentration measured immediately following preparation of the metal composite. In some embodiments, the iron concentration following oxidation may be from about 0.005 mmol/L to about 0.03 mmol/L.

The chromium content in the metal composites can be measured by dissolving the electrode in 0.5 M $H_2SO_4$ for ICP-OES testing. The metal composites may comprise chromium in a concentration of about 0.0001 to about 24 mmol/L, especially about 0.001 to about 10 mmol/L, for example from about 0.005 mmol/L to about 0.06 mmol/L, or from about 0.015 mmol/L to about 0.05 mmol/L or about 0.03 mmol/L to about 0.04 mmol/L. Following use as an OER catalyst, the chromium concentration may be lower than the chromium concentration measured immediately following preparation of the metal composite. In some embodiments, the chromium concentration following oxidation may be from about 0.005 mmol/L to about 0.03 mmol/L.

The metal content in the quaternary composites can be also measured by dissolving the electrode in 0.5 M $H_2SO_4$ for ICP-OES testing. They may comprise nickel in a concentration of about 0.0001 to about 24 mmol/L, especially about 0.001 to about 10 mmol/L, for example from about 0.01 mmol/L to about 8 mmol/L, or from about 0.1 mmol/L to about 7 mmol/L or about 0.1 mmol/L to about 6 mmol/L. The nickel concentration may be substantially changed following oxidation.

The metal composites may comprise cobalt and iron in a ratio from about 1:1 to about 10:1. For example, prior to use as an OER catalyst, the ratio of cobalt to iron (Co:Fe) on a weight for weight basis may be about 1.5:1 and following use as an OER catalyst, the ratio of cobalt to iron (Co:Fe) on a weight for weight basis may be about 3.5:1.

The metal composites may comprise cobalt and chromium in a ratio of from about 1:1 to about 10:1. For example, prior to use as an OER catalyst, the ratio of cobalt to chromium (Co:Cr) on a weight for weight basis may be about 1.5:1 and following use as an OER catalyst, the ratio of cobalt to iron on a weight for weight basis may be about 2.5:1.

The metal composites may comprise iron and chromium in a ratio from about 0.5:1 to about 1:0.5. In some embodiments, the ratio of iron to chromium (Fe:Cr) may be about 1:1 prior to use as an OER catalyst and following use as an OER catalyst, the ratio of iron to chromium (Fe:Cr) may be about 0.7:1 on a weight for weight basis.

The metal composites may comprise cobalt, iron and chromium in a ratio of about 1.5:1:1 following preparation and about 3:1:1 following use as an OER catalyst.

The quaternary metal composites may comprise cobalt, iron, chromium and nickel in a ratio of about 1.5:1.5:1:1 following preparation. The ratio may change after OER oxidation.

The composite may comprise cobalt, iron, chromium and optionally nickel in any combination of the above described concentrations and/or ratios.

The LDH materials of the invention comprise the metal composite interspersed with a hydroxide layer. The hydroxide layer is typically formed at the same time as the metal composite. Typically, the hydroxide layer comprises amorphous hydroxide. Further, the hydroxide layer may also comprise cationic species corresponding to the metals comprised within the metal composite, such as cobalt hydroxides and/or oxides, iron hydroxides and/or oxides and chromium hydroxides and/or oxides and when the composite is a quaternary metal complex, Ni hydroxides and/or oxides. In some embodiments, the hydroxide layer may comprise a mixed phase of amorphous hydroxide and Co based spinel oxides.

The LDH materials may adopt a spherical morphology. It is believed that the spherical morphology assists in enhancing the OER catalytic activity as it provides a layer with increased surface area. The spherical morphology may comprise a plurality of microspheres. The microspheres may be monodisperse in terms of their average size. In some embodiments, the microspheres have an average size about 100 nm to about 500 nm, for example, from about 100 nm to about 300 nm or about 200 nm. The average size of the microspheres may be determined by scanning electron microscopy (SEM).

In some embodiments, the LDH materials may be formed into nanodots by dropcasting amorphous oxide/hydroxide materials prepared by a hydrothermal treatment. In some embodiments, the nanodots may have a diameter less than 200 nm, for example, from about 1 nm to about 200 nm, especially about 3 nm to 100 nm. In some embodiments, the diameter may be 3 to 10 nm.

Also provided are catalytic materials comprising the LDH material described herein. The catalytic materials optionally comprise a substrate. Any suitable substrate that does not interfere with the OER catalytic activity of the LDH material may be employed. Suitable substrates include conductive metallic substrates (e.g. a metal substrate, such as a metal foam) and conductive non-metallic substrates (e.g. carbon fiber paper substrates). In some embodiments, the catalytic materials are in the form of nanodots.

Also provided are electrodes comprising the LDH material and a conductive substrate. Any conductive substrate that does not interfere with the OER catalytic activity of the LDH material may be used. Preferably, the conductive substrate will possess a high surface area, such as a metal foam. Suitable metal foams include nickel foam and copper foam. Preferably, the conductive substrate is a nickel foam. In some embodiments, the LDH material is present in the electrode in the form of nanodots.

Preparative Methods

The LDH materials of the invention may be prepared by any means known in the art provided that a metal composite is formed comprising cobalt, iron and chromium species.

In some embodiments, the catalytic materials and/or electrodes of the invention may be prepared by a facile electrodeposition process.

Accordingly, described herein is a process for preparing a composite material comprising cobalt, iron and chromium species on a substrate, the process comprising electrolysing a solution comprising cobalt, iron and chromium salts in solution that is in contact with the substrate. Suitable salts include nitrates, sulfates or chlorides. In particular embodiments, the salts are nitrates.

The process typically comprises contacting a conductive substrate with a solution comprising cobalt, iron and chromium ions, and applying a voltage across the substrate and a counter electrode through the solution to electrodeposit a composite material comprising cobalt, iron and chromium species on the substrate.

In these preparative methods, the cobalt, iron and chromium salts may be nitrate salts. The solution may comprise up to about 100 mM cobalt salts (e.g. up to about 75 mM or about 50 mM cobalt salts). The solution may comprise up to about 100 mM iron salts (e.g. up to about 75 mM or about 50 mM iron salts). The solution may comprise up to about 50 mM chromium salts (e.g. up to about 40 mM or about 30 mM chromium salts). Optionally the solution may comprise up to about 500 mM nickel salts (e.g. up to about 6 mM or up to about 100 mM nickel salts). Typically, the solution is an aqueous solution.

The solution may further comprise one or more electrolytes. Suitable electrolytes include salts, such as potassium chloride (KCl). The electrolyte may be present in a concentration of about 1 M.

In some embodiments, with a three-electrode system and constant potential input, the applied potential between the substrate and the reference electrode is about −0.6 V to −2.0 V vs reference, especially about −1.0 V vs reference.

In some embodiments, a constant current electroplating method is used where a constant current is applied to a two-electrode system. A suitable constant current is about 1 mA cm$^2$ to about 3 mA cm$^2$.

During the process, —OH ions are generated from electrodecomposition of water in the plating bath and these ions co-precipitate onto the substrate with the Co, Fe and Cr ions, thereby forming the double hydroxide layer.

In some embodiments, the process further comprises a substrate pretreatment step, where the substrate is washed with a strong acid (such as 4M HCl) and ultrasonicated. The pretreatment step typically removes oxides and other impurities from the substrate surface prior to electrodeposition of the LDH material.

In some embodiments, the process also involves the inclusion of a reference electrode in the electrolysis cell and which is also in contact with the solution. Suitable reference electrodes include Ag/AgCl, reference hydrogen electrodes, Ag/Ag$_2$SO$_4$ electrodes, Calomel electrodes, Hg/Hg$_2$SO$_4$ electrodes and Hg/HgO electrodes. In particular embodiments, the reference electrode, when used, is an Ag/AgCl electrode.

The conductive substrate may be a metal foam, such as a copper or nickel foam, preferably a nickel foam. Following electrodeposition, the metal foam may possess a mass loading of LDH material of about 1 mg/cm$^2$ to about 5 mg/cm$^2$, such as about 2 mg/cm$^2$.

In another embodiment, the ternary or quaternary metal composite LDH materials may be prepared by a hydrothermal method to produce a solid product that may be ground to a powder. For example, a mixture of cobalt, iron, chromium and optionally nickel, salts are suspended in aqueous alcohol such as aqueous methanol and heated in an autoclave at about 180° C. for about 12 hours. The suspension is then cooled, washed with water and collected and dried under vacuum, optionally at elevated temperature. The dried product may be ground to produce a powder.

Nanodots may be prepared by forming a homogenous suspension by mixing the powder with aqueous alcohol, such as aqueous ethanol or aqueous methanol together with a binding agent such as Nafion®. Thorough mixing to achieve the homogeneous suspension may be achieved by any suitable mixing procedure such as sonication.

The homogeneous suspension may be dropcast onto a substrate such as an electrode or conducting substrate. Suitable substrates include, but are not limited to, glassy carbon electrodes or metal foams such as nickel or copper foams.

In another aspect of the invention there is provided a process for preparing catalytic material of the invention comprising treating a mixture of cobalt ions, iron ions and chromium ions to a temperature between about 150° C. and about 220° C., especially about 150° C. and about 220° C. for between about 8 to about 50 hours, especially about 8 to about 20 hours, cooling the mixture and collecting the product.

In particular embodiments, the temperature is between about 170° C. to about 190° C., especially about 180° C. In particular embodiments, the time of heating is between about 10 and about 15 hours, especially about 12 hours.

In some embodiments, the mixture may further include other metal ions, for example, nickel ions.

In some embodiments, the product is ground to a powder suitable for dropcasting.

Methods of Use

The invention provides a method of evolving oxygen from water splitting. The method is carried out in an electrochemical cell, which comprises an anode, a cathode, an electrolyte solution and optionally a reference electrode. The method comprises contacting water with the anode and the cathode of the electrochemical cell, and applying a voltage across the anode and the cathode. As the OER half reaction typically occurs at the anode, it is the anode comprises the LDH material of the invention, for example, in the form of an electrode. In some embodiments, the electrolyte solution is an aqueous electrolyte solution. The aqueous electrolyte solution may also be the source of the water. Typically, the water will have an alkaline pH, for example, a pH of at least 8, 9 or 10 or more. In some embodiments, the water comprises a strong base, for example, a hydroxide base such as NaOH or KOH, for example at a concentration of from 0.1 M up to about 10 M or more.

Typically, the cathode used in these methods will comprise a hydrogen evolution reaction (HER) catalyst, such as Pt/C or nickel.

When used in these methods, the LDH materials of the invention provide comparable catalytic activity to the present leading OER catalysts. Surprisingly, the LDH materials are able to provide similar catalysis while using Earth-abundant metals. Also surprisingly, the LDH materials are able to provide improved catalytic activity and require a lower overpotential to other known Earth-abundant metal-based OER catalysts, including corresponding CoFe LDHs (i.e. LDH materials prepared by similar routes but lacking chromium).

In some embodiments, the method of evolving oxygen proceeds with a Tafel slope of up to 40 mV dec$^{-1}$, for example up to 39 mV dec$^{-1}$, 38 mV dec$^{-1}$, 37 mV dec$^{-1}$, 36 mV dec$^{-1}$, 35 mV dec$^{-1}$ or 32 mV dec$^{-1}$.

The voltage applied across the anode should be selected to match or exceed the overpotential for the LDH material in order to drive OER.

The LDH materials of the invention require relatively low overpotentials at the anode to drive OER. In some embodiments, the LDH materials catalyse OER with an overpotential of about 270 mV to provide a charge density of about 100 mA cm$^{-2}$. The onset potential for OER is only about 1.43 V vs reversible hydrogen electrode (RHE) as a reference, which compares favourably to the theoretical minimum onset potential of 1.23V vs RHE for OER. Accordingly, in some embodiments, the voltage applied to the solution will be at least 1.43 V vs RHE, for example, from 1.43 V vs RHE to about 10 V vs RHE, about 1.5 V vs RHE to about 10 V vs RHE, about 1.43 V vs RHE to about 5 V vs RHE, about 1.43 V vs RHE to about 3 V vs RHE or about 1.5 V vs RHE to about 3 V vs RHE.

In some embodiments, the LDH materials are present on the electrode in the form of nanodots.

Also provided is an electrolyser comprising an anode and a cathode, a power supply and optionally a reference electrode. Typically, the anode comprises the LDH materials of the invention. In some embodiments, the power supply provides electricity generated from a low carbon intensive power source. The power source may be a renewable power source, for example, one or more solar panels or wind turbines, or a non-renewable power source, for example, a nuclear reactor.

EXAMPLES

The invention will be further described by way of non-limiting example(s). It will be understood to persons skilled in the art of the invention that many modifications may be made without departing from the spirit and scope of the invention.

Example 1

Experimental

Materials synthesis. All chemicals were purchased from supplier and used without further purification. Nickel foam (NF, 1.5 mm thickness, 110 ppm) or copper foam (CF, 1.5 mm thickness, 110 ppm) as substrate was washed and ultra-sonicated in 4.0 M hydrochloric acid (HCl, 32.0% RCI LABSCAN Ltd) for 10 min to remove oxides on the surface. Then the substrate was rinsed by Mill-Q water (18.2 MO-cm$^{-1}$) three times and dried under $N_2$ flow. The substrate material was cut into a certain size and sealed with Teflon tape with the exposed geometric surface area of 1×1 cm$^2$. Thereafter, the substrate was used as the working electrode in a standard three-electrode system, where graphite plate and Ag/AgCl (1.0 M KCl) are counter electrode and reference electrode, respectively. The depositing bath contains 0~48 mM cobalt nitrate ($Co(NO_3)_2 \cdot 6H_2O$, Chem-Supply), 0~48 mM iron nitrate ($Fe(NO_3)_3 \cdot 9H_2O$, Chem-Supply) and 0~24 mM chromium nitrate ($Cr(NO_3)_3 \cdot 9H_2O$, Jax Chemicals). The electrodeposition was carried out under an applied potential of −1.0 V vs Ag/AgCl (1.0 M KCl) by using CHI760D potentiostat for 0~7200 s. The as-prepared electrode was slowly taken out from electrolyte and rinsed by Milli-Q® water and dried in $N_2$ flow. To prepare the commercial catalytic electrode as control sample, 20 mg Ir/C catalyst (20% Ir on Vulcan XC-72, Premetek Co.) was dispersed into the solvent mixed with 480 μL $H_2O$, 480 μL absolute ethanol ($C_2H_5OH$, Chem-Supply) and 40 μL Nafion® (5%, Aldrich). The suspension was ultra-sonicated for 20 min to obtain the homogeneous ink and then drop-casted and dried onto the NF or CF substrate, where the mass loading was 2.0 mg·cm$^{-2}$.

Materials characterisation. The scanning electron microscopy (SEM, JSM7001 F) and high-resolution transmission electron microscopy (HRTEM, Philips CM200) were employed to observe the micro morphology of the as-prepared materials. X-ray energy-dispersive spectroscopies (EDS) attached on TEM were applied to investigate the element distribution. Raman spectra were recorded on a Renishaw spectrometer by using a laser of λ=532 nm. Chemical environment and compositions were analyzed by X-ray photoelectron spectroscopy (XPS, Thermo ESCALAB250i). The atomic quantities of the surface element of the electrode before and after long-term OER testing were measured by Inductively Coupled Plasma Optical Emission Spectrometer (ICP-OES, 7300 PerkinElmer). The obtained electrode (0.5×0.5 cm$^2$) was dipped into 15 mL 0.5

M H₂SO₄ aqueous solution and ultra-sonicated for 20 min. Then the solution was collected and tested in ICP-OES system.

Electrochemical measurements. The electrode was placed in 1.0M potassium hydroxide solution (KOH, Chem-Supply) in standard three-electrode system. The counter electrode and reference are graphite plate and Ag/AgCl (1.0 M KCl), respectively. The as-prepared electrode was firstly scanned in cyclic voltammetry (CV, −0.2~0.6 V vs reference, 10 mV·s⁻¹) for more than 20 cycles to achieve a stable performance. Then the performance was evaluated from linear sweep voltammetry (LSV, 5.0 mV·s⁻¹, 95% iR compensation) and chronopotentiometry to demonstrate its long-term durability under the current density of 100 mA·cm⁻². The recorded potential values were calibrated to reversible hydrogen electrode (RHE) according to following equation:

$$E_{RHE} = E_{vs.ref.} + 0.222 + 0.059 \cdot pH \quad (1)$$

The Tafel Slope was recorded and derived from near-static LSV at the scanning rate of 0.1 mV s−1 with 95% iR-compensation. Of note, only LSV tests in this work were iR corrected. Meanwhile the electrochemically active surface area (ECSA) was calculated based on the charge/discharge process in double layer capacitance during non-Faraday process. The charge/discharge current (IC) is related to the scan rate (v) and to the electrochemical double-layer capacitance (Cdl) which may be described by equation (2):

$$I_C = v \cdot C_{dl} \quad (2)$$

Thus, the ECSA can be calculated by measuring CVs at various scanning rates. The electrochemical impendence spectroscopy was collected in the standard three-electrode system as described above in 1 M KOH solution by using Autolab potentiostat (Metrohm). The frequencies of input sine signal ranged from 100 KHz to 0.01 KHz under a particularly applied potential and the amplitude was 10 mV. The measured plots were further simulated by Zimpwin software. The double layer capacitor (Cdl) can be calculated from simulated constant phase element (Q) value according to the equation (3):

$$Cdli = [Qi/(Rs-1+Ri-1)(1-ni)]1/ni \quad (3)$$

where $R_s$ and $R_t$ are solution resistance and charge transfer resistance in simulated circuit respectively and n represents for phase angle value.

The turn over frequency (TOF) is calculated by equation (4):

$$TOF = j \cdot A/(4F \cdot m) \quad (4)$$

where j, A, F and m are respectively the current density at a certain overpotential, the area of the electrode, the Faraday constant (96,485 C/mol) and the moles of the active materials on the substrate which can be determined by weight difference before and after electrodeposition.

Results and Discussion

Figure 1:
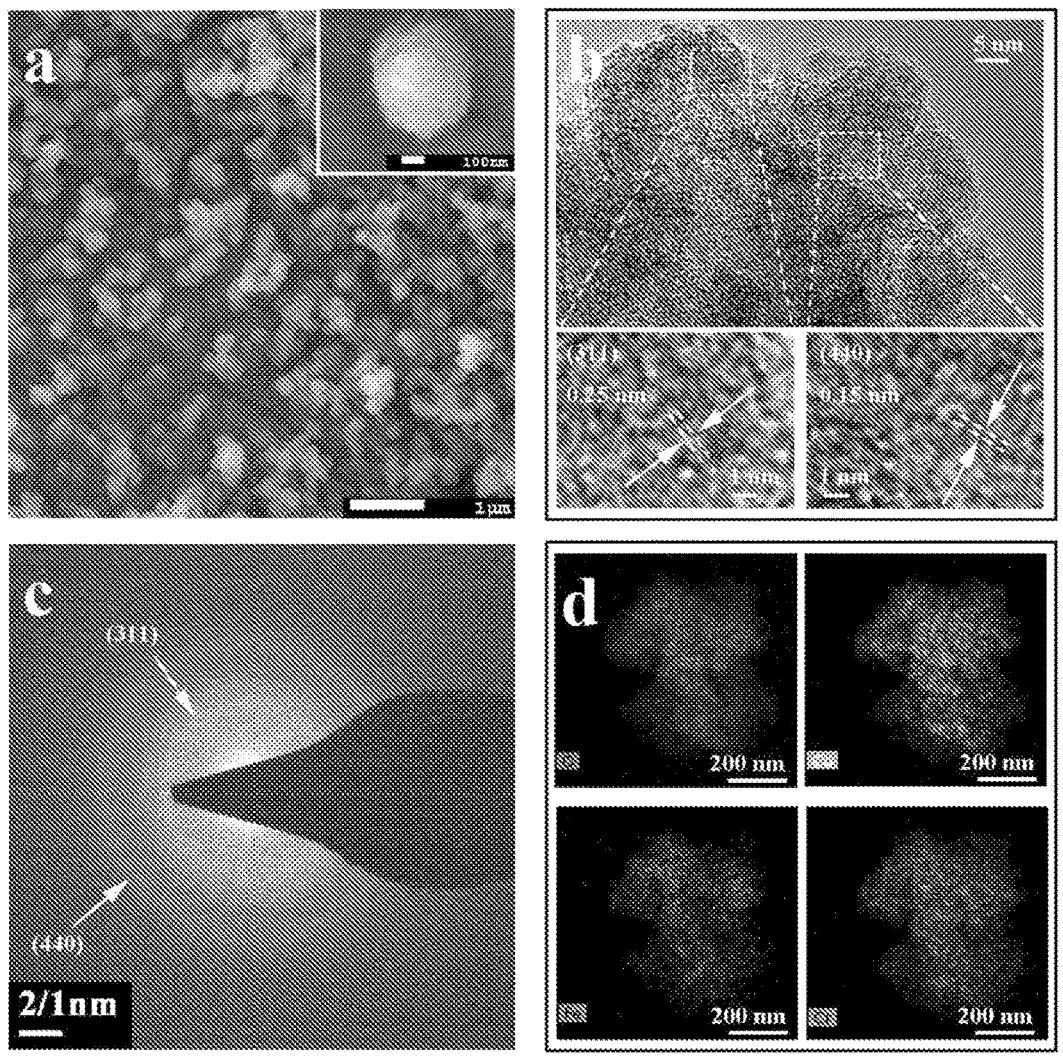
Figure 2:
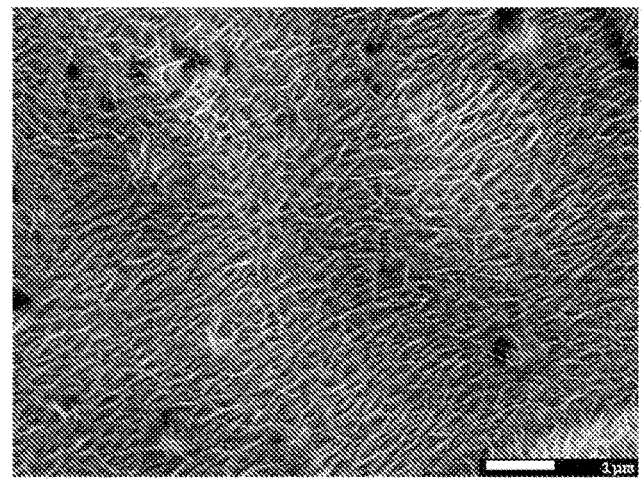
FIG. 2 shows a SEM image of the CoFe composites on NF obtained in chromium-free electrolyte.
Figure 3:
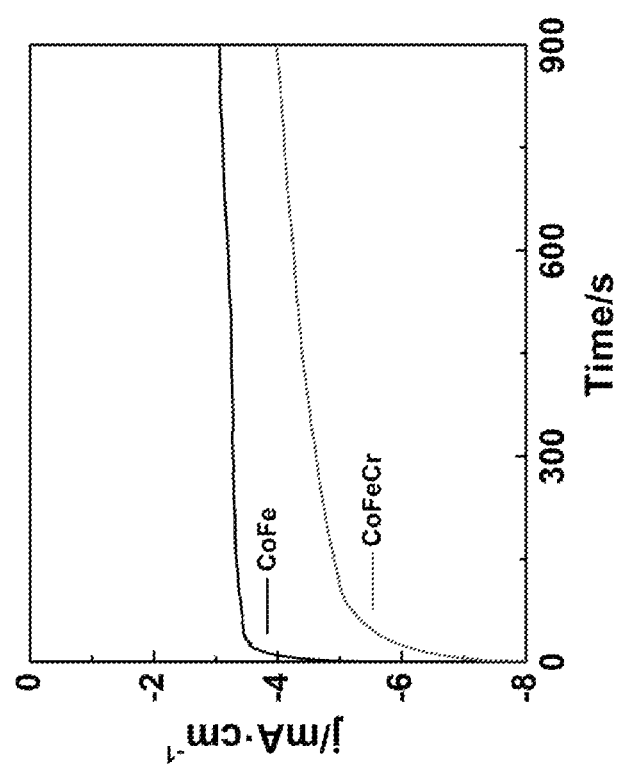
FIG. 3 shows a chart of current versus time (J-t curve) measured during electrodepositing of CoFe composite (upper) and CoFeCr composite (lower) composites on NF.
Figure 4:
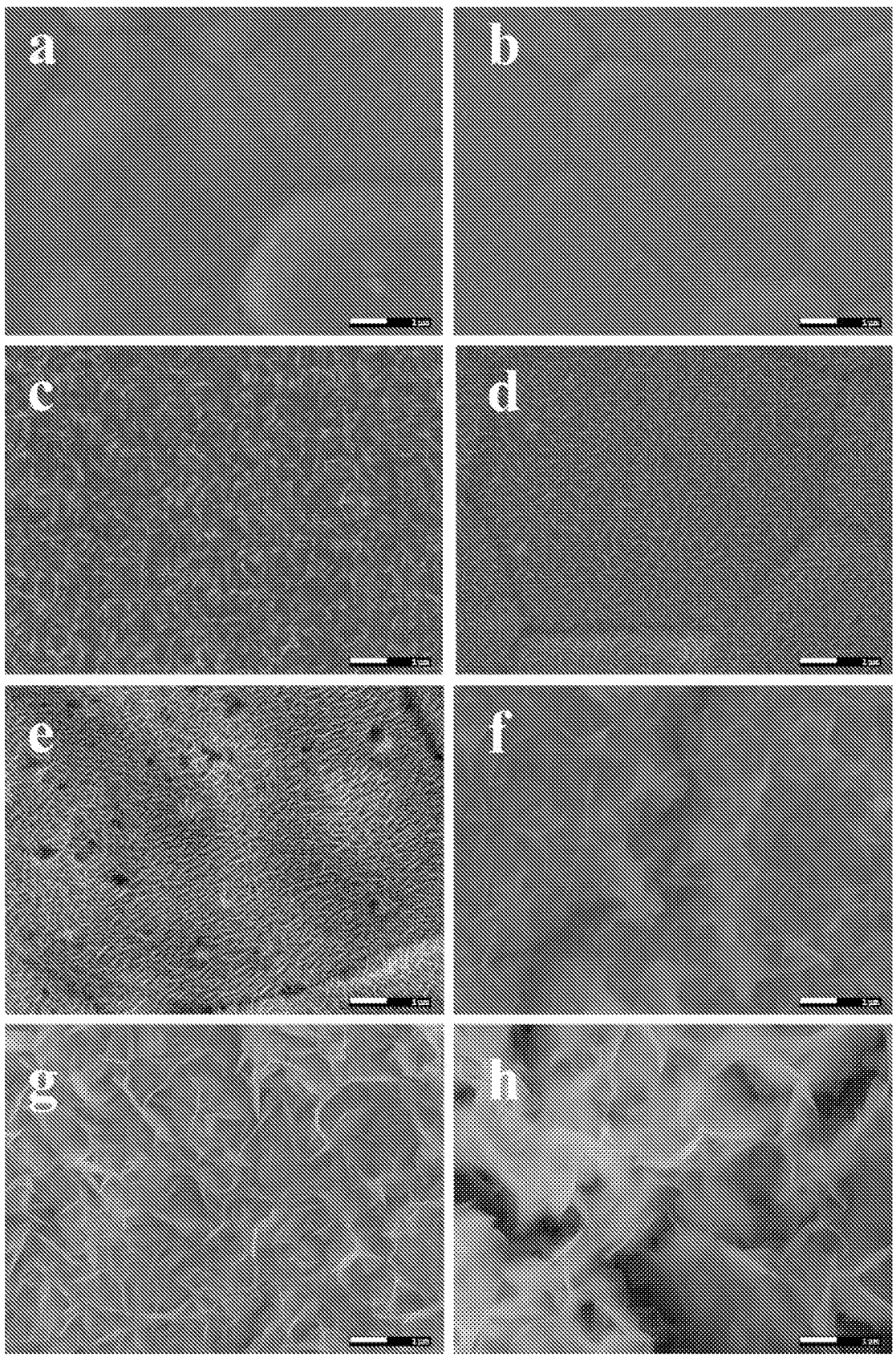
Figure 5:
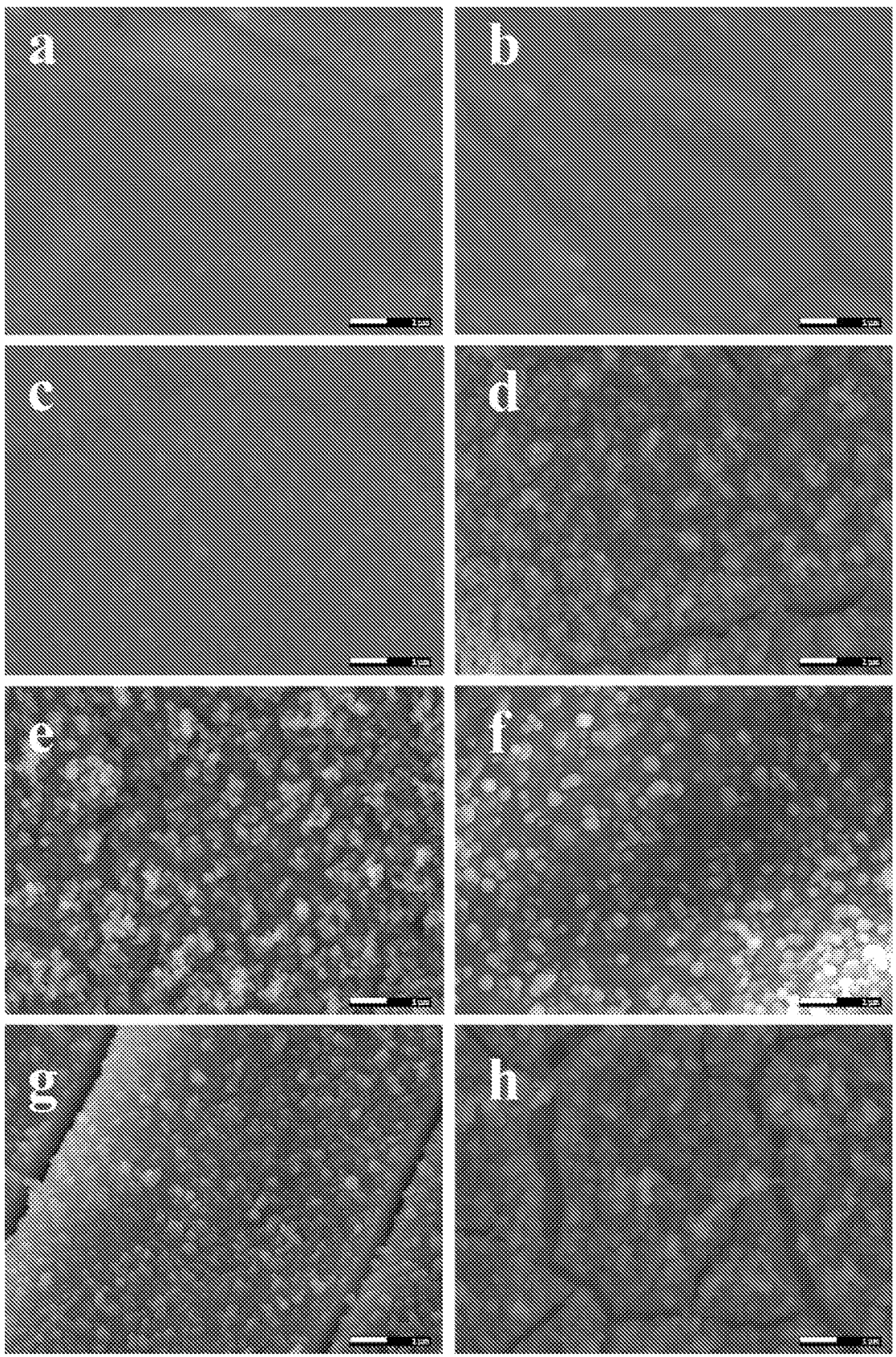

The CoFeCr LDH electrode was prepared by electrodeposition at the applied potential of −1.0 V vs Ag/AgCl (1 M KCl) reference in nitrate-based electrolyte. At this condition, the OH⁻ ions generated from electro-decomposition of H₂O co-precipitates with the local $Co^{2+}$, $Fe^{3+}$ and $Cr^{3+}$ ions in the solution onto the nickel foam (NF) substrate (denoted as CoFeCr/NF). After deposition, a brown-colored film on NF is observed, which is different from the green CoFe composite (denoted as CoFe/NF) as control. The morphologies of the samples are characterised by SEM. As shown in FIG. 1a, the obtained CoFeCr composite displays a layer of monodispersed microspheres, with a size of ~200 nm in diameter (see the insert in FIG. 1a), which is distinctly different from the nanosheet arrays structure of CoFe composite grown on NF in FIG. 2. To understand the morphology transformation from the nanosheet for CoFe to the microsphere for CoFeCr, the crystal nucleation and growth details are further investigated. FIG. 3 shows the dynamic crystal growth process (electrodepositing current vs time) for CoFe and CoFeCr on NF. For CoFe, after applying a negative potential of −1.0 V (vs Ag/AgCl), the current density sharply decreased from ~5.0 mA·cm⁻² to 3.5 mA·cm⁻² at the first 20 s, indicating a fast nuclei formation and crystalline growing process. As shown in the time-dependent SEM (FIG. 4a), a large amount of nanosheet nuclei are formed and the CoFe continuously grown on the pre-formed nanosheet nuclei and maintained the original nanosheet structure (FIG. 4b~h). However, when Cr is included, the depositing i-t curve undergoes a different nucleation route (FIG. 3): The electrodeposition curve first shows a similar sharp decrease of current density from 8 to 6 mA·cm⁻² at the early 30 s, indicating the formation of nuclei on the substrate. Interestingly, another slow degradation of current is observed for the following 30 to 150 s, revealing an immediate second nucleation happened due to the "regulation effect" of Cr. The time-dependant morphology evolution of the CoFeCr is shown in FIG. 5. Initially, a thin layer of nanosheet nuclei accompanied with few nanospheres structure is formed on the substrate (FIG. 5a). With the prolonged depositing, more and more nanospheres begun to emerge and became the dominate feature (FIG. 5b~c), and eventually lead to formation of uniform CoFeCr microspheres covered on NF electrode (FIG. 5d-h and FIG. 6).

The crystal structure of the aggregated nanosheet from CoFeCr composite microsphere was further characterised by high resolution TEM (HRTEM) in FIG. 1b. As shown in the HRTEM images, two lattice fringes are measured as ~0.25 nm and ~0.15 nm, corresponding to the (311) and (440) facets of $CoCr_2O_4$ (PDF #22-1084) and $CoFe_2O_4$ (PDF #22-1086) spinel phases, respectively. The selected area electron diffraction (SAED) pattern in FIG. 1c shows the halos around two rings, confirming the mixture of amorphous CoFeCr hydroxide composite and crystallized spinel phase. Moreover, the elemental mapping obtained by energy dispersive spectroscopy (EDS) on TEM is given in FIG. 1d, demonstrating the uniform elemental distribution of O, Co, Fe, and Cr. Raman spectrum in FIG. 7 also shows the existence of spinel phase and the two strong peaks occurring around ~554 and ~688 cm⁻¹ assign to octahedral (OH) and tetrahedral (Td) M-O stretching, respectively. As the introduction of chromium into the CoFe composite, the OH peak assigned to LDH becomes wider indicating more defects were formed. The Td peak is stronger than that of CoFe composite, confirming the formation of para-spinel phase in CoFeCr composite.

Figure 8:
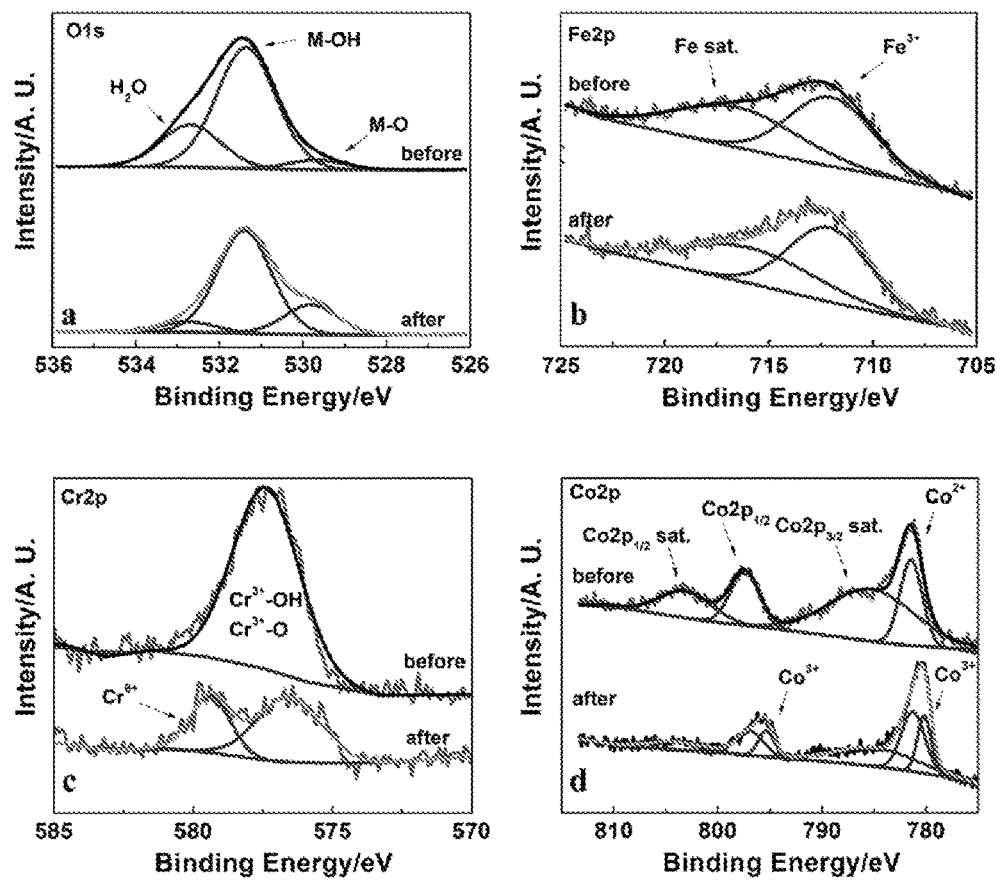

The chemical component and electronic structure of the prepared CoFeCr/NF electrode before and after OER were studied by XPS. As shown in FIG. 8a, the core-level O1s XPS, three fitted peaks are observed at ~533.1 eV, ~531.5 eV and ~529.8 eV, assigned to O bond in liquid water, M-OH and M-O bonds, respectively. Particularly, the presence of M-OH and M-O is associated with the hydroxides or (oxy)hydroxides [28]. After OER test, the intensity of O in liquid water decreased and the peak corresponding to the M-O bond became stronger. The intensity change before and after OER can be attributed to the residual intermediate MOOH phase. For Fe2p XPS spectra in FIG. 8b, it remains a constant $Fe^{3+}$ oxidation state before and after OER testing as evidenced from the satellite peak (~716.9 eV) and $Fe^{3+}$ peak (~712.0 eV). The core-level Cr2p XPS spectra in FIG. 8c shows a strong broad peak at ~577.0 eV before OER, assigned to $Cr^{3+}$ in Cr—OH and Cr—O [19]. However, this broad peak splits into two peaks after OER testing and the newly-appeared peak at ~579.7 eV is assigned to a higher chromium oxidation of $Cr^{6+}$. FIG. 8d depicts the high resolution XPS XPS of Co2p in CoFeCr composites and the two peaks at ~803.2 eV and ~787.1 eV assign to $Co2p_{1/2}$ and $Co2p_{3/2}$ satellite features, respectively. The fitted peaks of $Co2p_{1/2}$ (~796.8 eV) and $Co2p_{3/2}$ (~781.2 eV) indicate that cobalt in the composite is mainly in $CO^{2+}$ oxidation valence [32, 33]. And the Co oxidation state of the freshly prepared sample stays almost unchanged at $Co^{2+}$ as shown in FIG. 9. It is known that for the Cobalt-involved water oxidation electrolysis, after applying an OER potential, partial $Co^{2+}$ is converted into higher oxidation valence in CoOOH intermediate phase, which is considered as the active site. But, there are β-CoOOH and γ-CoOOH phases in CoOOH intermediate, whose oxidation state is between 3+ and 4+. And according to DFT calculation, Co at relatively lower oxidation state in β-CoOOH state is the most active site rather than the higher valence Co in γ-CoOOH. (Similarly, this relatively lower state of Ni in NiOOH active phase is also found in β-NiOOH for water oxidation.) Furthermore, the active β-MOOH can be degraded into less active γ-MOOH (higher oxidation valence) by overcharging [36]. Therefore, to maintain the relatively lower oxidation state of Co in β-CoOOH is the key to improve OER performance. So, similar to the widely observed oxidation state changes under a positive applied potential, the cobalt in CoFeCr is also oxidized to higher valance, at least on the surface, to catalyze water for $O_2$ bubble production. However, the Co2p XPS in FIG. 10 for CoFeCr after OER shows less residual $Co^{3+}$ state ($Co^{2+}/Co^{3+}$=1.8) than that for CoFe ($Co^{2+}/Co^{3+}$=1.1) after long-term oxidation. This phenomenon reveals that although $Co^{2+}$ in CoFeCr composite can be converted into CoOOH active intermediate phase with higher oxidation state during OER, the average Co oxidation state is relatively lower than that in CoFe since less $Co^{3+}$ oxidation valence is observed after water oxidation. The reason for this unique observation may be that during water oxidation, chromium in the composite is partially oxidized into high valence $Cr^{6+}$ and the electrons generated by this oxidation reaction can be transferred to the cobalt sites to maintain cobalt at a relatively lower oxidation valence state (between $Co^{2+}$ and $Co^{3+}$). This synergistic effect can efficiently stop the β-CoOOH de-activation by overcharging so as to lead enhanced OER performance. Additionally, the chemical component of CoFeCr composite is examined by ICP-OES measurement. The atomic ratio of Co, Fe and Cr is ~3:2:2 as shown in Table 1.

TABLE 1

Inductively coupled plasma optical emission spectrometry (ICP-OES) data

| Sample | Co | Cr | Fe | Ni | S |
|---|---|---|---|---|---|
| Fresh CoFeCr (mg/L) | 2.63 | 1.77 | 1.70 | 17.60 | 14925 |
| Fresh CoFeCr (mmol/L) | 0.0446 | 0.0339 | 0.0305 | 0.3001 | 531 |
| Oxidized CoFeCr (mg/L) | 2.66 | 0.80 | 1.07 | 41.30 | 15112 |
| Oxidized CoFeCr (mmol/L) | 0.0451 | 0.0154 | 0.0192 | 0.7034 | 538 |

The OER performance of the as-prepared CoFeCr composite and other control samples such as CoFe, CoCr, FeCr composites (denoted as CoFe/NF, CoCr/NF and FeCr/NF respectively) and commercial Ir/C were evaluated in 1 M KOH electrolyte. To optimise the OER electrode, we firstly varied the preparation conditions including tuning the ionic precursor addition and depositing time (FIG. 11), and the optimized CoFeCr/NF was electrodeposited in an electrolyte containing 12 mM $Co^{2+}$, 3 mM $Fe^{3+}$ and 6 mM $Cr^{3+}$ for ~900 s. The linear sweep voltammetry (LSV) for CoFeCr/NF electrode in FIG. 12a displays the most active ability: the onset potential value is only ~1.43 V vs RHE rather than ~1.47 V from CoFe/NF [Can be quantified from the intersection of the Tafel slope (dash line) and y-axis (x=0) in FIG. 12c and FIG. 13]. In detail, to achieve a current density of 10 $mA·cm^{-2}$ and 100 $mA·cm^{-2}$, the feedback potentials are only ~1.46 V and ~1.50 V vs RHE, respectively. The OER performance of the obtained ternary CoFeCr composite is better than that of the combination of CoFe, CoCr or FeCr binary composite. The OER performance of CoFeCr/NF electrode even outperforms the commercial Ir/C catalyst on NF as well as the benchmark NiFe LDH (denoted as NiFe/NF) electrode. By measurement of the weight difference after electrodeposition on NF, ~1.22 mg composites were achieved on the substrate. Referring to the above elemental ratio from ICP, the stoichiometry can be determined as $Co_3Fe_2Cr_2(OH)_{18}$, therefore, the TOF value for the CoFeCr composite at overpotential of 250 mV is calculated as 0.046 $s^{-1}$. In comparison, the TOF of CoFe composite at 250 mV is only 0.008 $s^{-1}$, indicating faster response in OER reaction with the introduction of chromium. Of note, the small peaks in FIG. 4a around 1.33~1.36 V vs RHE are attributed to the oxidation of nickel substrate. And according to the very first LSV scans of the composites on copper foam to get rid of the effect from nickel substrate in FIG. 14, the anodic peaks around 1.15 V vs RHE on both CoFe and CoFeCr composites represent for the formation of the intermediate CoOOH phase. The weaker peak from CoFeCr composite also indicates less $Co^{2+}$ has been oxidized into a higher valence state under the protection of Cr present.

Figure 12:
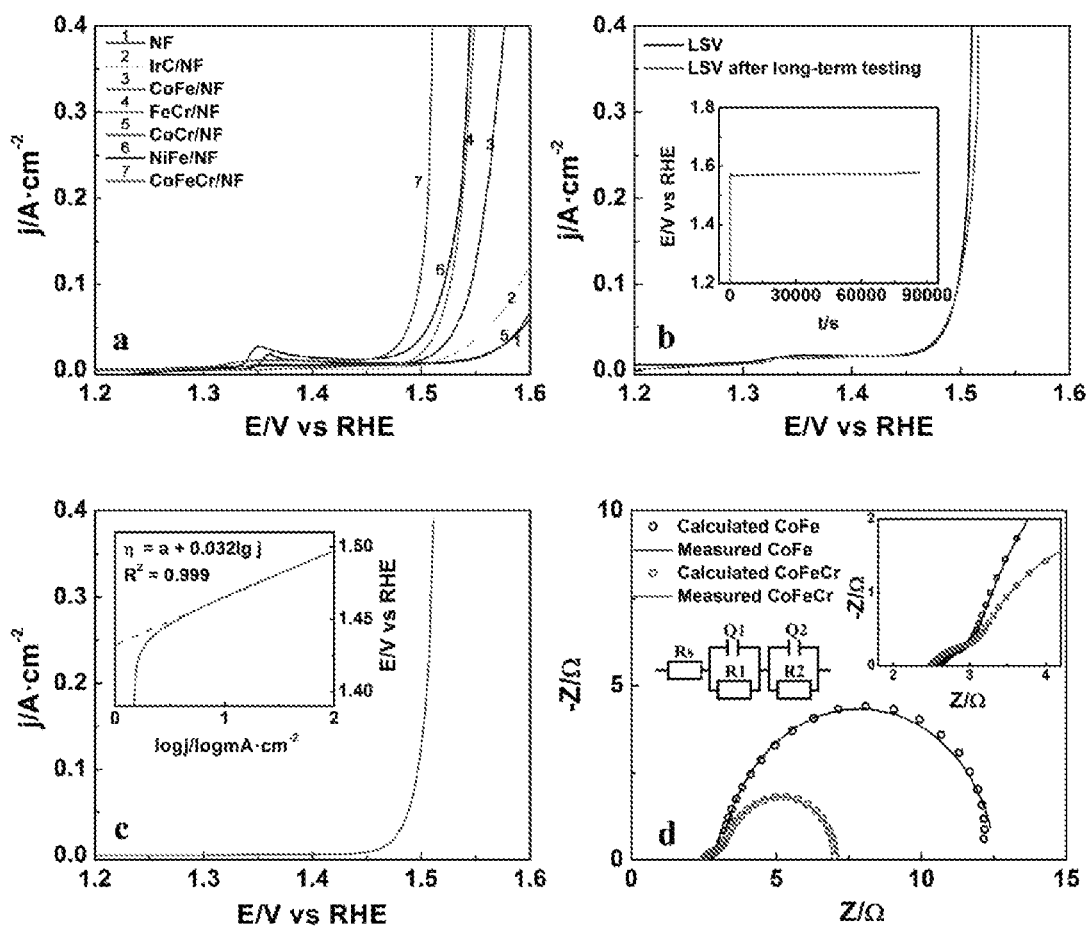
Figure 13:
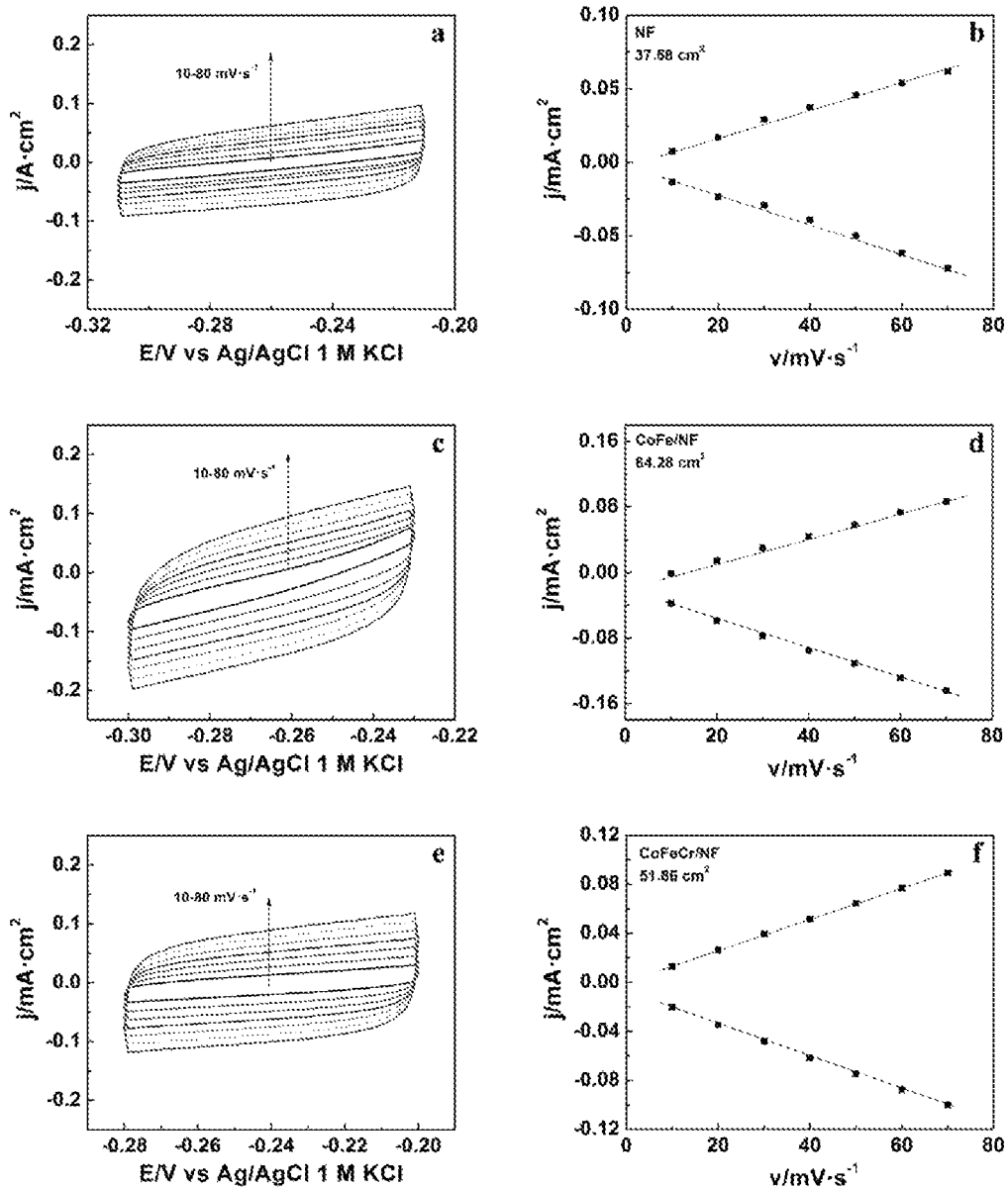

Long-term stability is another critical issue for practical applications. The long-term stability of the electrode is measured by chronopotentiometry at a relatively high current density of 100 $mA·cm^{-2}$. As given in the inserted picture in FIG. 12b the feedback potential maintains well at ~1.58 V vs RHE without degradation for more than 24 hours. The robustness of the CoFeCr electrode after the chronopotentiometric also reflects the unchangeable OER performance by re-testing its LSV curves in comparison with the initial LSV (FIG. 12b). Furthermore, the structural morphology (FIG. 15) of CoFeCr/NF remains the microsphere structure after more than 24 hours OER testing, indicating the structural stability of the composites in alkaline media. To quantify the composition of the post-electrode, the ICP-OES data of the CoFeCr/NF electrode was also measured after long-term oxidation. As shown in Table 1, the atomic ratio of Co, Fe and Cr is ~3:1:1, suggesting the dissolution of excess Fe and Cr during oxidation but without sacrificing the duration of electrode. It should be noted that this facile synthesis approach is also applicable to deposit the highly active materials on other conductive substrates such as copper foam (CF) to remove the strong synergistic effect from nickel substrate. As shown in FIG. 16, the CoFeCr composite on CF still shows the best OER performance, however, the performance of FeCr/CF becomes much worse than that of the FeCr/NF (FIG. 12a).

To understand the mechanism of the enhanced OER performance, the ECSA values of NF, CoFe/NF and CoFeCr/NF electrodes were measured by CVs capacitance technique (FIG. 13) and the ECSA values are simulated as 37.58 cm$^2$, 64.28 cm$^2$ and 51.86 cm$^2$ for NF, CoFe/NF and CoFeCr/NF, respectively. As seen from the above data, the ECSA of CoFeCr/NF is smaller than that of the CoFe/NF electrode. The reduction of the ECSA of CoFeCr composite is due to the formation of the aggregated microspheres in comparison to the nanosheet structures of the CoFe/NF composite. The above result implies that, on one hand, the improvement of OER performance might be not attributed to the ECSA, and on the other hand, other factors such as different reaction kinetics or electron transfer rates may contribute to the improved OER performance of CoFeCr electrode. To confirm our hypothesis, another LSV (FIG. 12c) was measured at a much slower scanning rate of 0.1 mV·s$^{-1}$ to acquire a near-equilibrium reaction state on the electrode. Then, the Tafel Slope (insert in FIG. 8c), related to the rate-determining step (RDS), was derived from this polarization curve and a Tafel slope of 32 mV·dec$^{-1}$ is obtained from this near-equilibrium LSV. The intersection of the Tafel slope (dash line) and y-axis (x=0) represents the onset potential value of ~1.43 V vs RHE. Theoretically, the Tafel slope value of 40 mV·dec$^{-1}$ corresponds to the third charge-transfer RDS of M-O+OH$^-$→M-OOH+e$^-$ as RDS. Herein, the smaller Tafel Slope value of 32 mV·dec$^{-1}$ indicates RDS process has been accelerated, compared with the Tafel slope value of 40 mV·dec$^{-1}$ from CoFe composite in FIG. 17.

To further confirm the mechanism of OER process, electrochemical impedance spectroscope (EIS) was tested under the applied potential of ~1.48 V vs RHE in FIG. 12d. A small semicircle (insert in FIG. 12d) in high-frequency area and a big semicircle in low-frequency area are demonstrated. And the model of $R_s(Q_1R_1)(R_2Q_2)$ is introduced to simulate the equivalent circuit for OER process. $R_s$ value represents for the resistance of solution from the working electrode to reference electrode and $R_1$ and $R_2$ values are the resistances of charge transfer. Of note, the double layer capacitor is simulated from constant phase element ($Q_1$, $Q_2$), which is more accurate on the rough surface of the NF substrate. Herein, the intersection point on x-axis in high-frequency region representing the $R_s$ values for CoFe and CoFeCr composites are 2.59 and 2.48) respectively, indicating the solution resistance between the working and reference electrode. The small semicircle ($Q_1R_1$ in the simulated model) in high frequency area indicates the formation of active CoOOH intermediate phase and the large semicircle ($Q_2R_2$) in low frequency area corresponds to the charge transfer of rate determine step process during OER. The simulated parameters are listed in Table 2 in detail. To be specific, the resistance ($R_1$) of charge transfer process for intermediate in CoFeCr composite is larger than that of the CoFe composite, demonstrating the less conversion of Co$^{2+}$ to higher oxidation state under the overcharged potential of 250 mV. And it thereafter leads to less β-CoOOH degradation and to a faster charge transfer process (smaller $R_2$ value) for OER in CoFeCr/NF than that of CoFe/NF, indicating the RDS process is accelerated on CoFeCr/NF electrode.

TABLE 2

| EIS simulated parameters | | |
|---|---|---|
| | Applied potential of 1.48 V vs RHE | |
| | CoFe/NF | CoFeCr/NF |
| | Model | |
| | Rs(Q1R1)(Q2R2) | Rs(Q1R1)(Q2R2) |
| Rs/Ω | 2.593 | 2.482 |
| Q1/S · s$^n$ | 0.080 | 0.072 |
| n1 | 0.565 | 0.576 |
| C1/mF | 6.844 | 7.627 |
| R1/Ω | 0.648 | 0.871 |
| Q2/S · s$^n$ | 0.065 | 0.152 |
| n2 | 0.948 | 0.965 |
| C2/F | 0.058 | 0.144 |
| R2/Ω | 9.370 | 3.713 |

This Example describes a ternary cobalt-iron-chromium hydroxide composite on nickel foam substrate as prepared by a facile electrodeposition method. The as-prepared electrode shows excellent OER performance and electrochemical duration in alkaline media. By introducing chromium into cobalt-iron composite, the nanosheets gradually aggregate into microspheres with the mixed phase of amorphous hydroxide and Co based spinel oxides. The intrinsic electrocatalytic improvement is studied in detail: the chromium in the composite is partially oxidized into 6+, which can protect cobalt active sites to maintain at a relatively lower oxidation valence state in β-CoOOH. And it thereafter accelerates the RDS of M-O+OH$^-$→M-OOH+e$^-$ by the evidence from Tafel slope value and EIS plots simulation.

Example 2

NiCoFeCr Composite Materials

An active NiCoFeCr LDH electrode was fabricated by electrodeposition. The electrodeposition bath contained 6 mM nickel nitrate, 6 mM cobalt nitrate, 3 mM iron nitrate and 6 mM chromium nitrate in aqueous solution.

For potentiostatic electrodeposition, a three electrode system was used where the working, counter and reference electrodes were copper foam, graphite plate and Ag/AgCl respectively. The applied potential was −1.0 V vs Ag/AgCl reference.

For amperostatic electrodeposition, a two electrode system was used with a working and counter electrode, copper foam (or nickel foam) and graphite plate respectively. A constant current with a current density of −2-3 mA/cm$^2$ was applied for 300 s.

The electrode was slowly removed from the electrolyte, rinsed with Milli-Q® water and dried in an N$_2$ flow. The electrode was then evaluated in a three electrode system with a graphite plate counter electrode and an Ag/AgCl reference electrode in a water splitting reaction. The performance of the OER was compared to a CoFeCr/CF electrode and a NiFeCr/CF electrode. The results are shown in FIG. 18. The quaternary NiCoFeCr electrode showed enhanced performance compared to the ternary CoFeCr and NiFeCr electrodes on a copper foam substrate.

Example 3

CoFeCr LDH Nanodots

CoFeCr composite LDH nanodots were synthesised by a hydrothermal method.

The precursor solution contained 1 mmol cobalt nitrate, 1 mmol iron nitrate, 1 mmol chromium nitrate, 60 mL of methanol and 12 mL of water. The solution was then transferred to a sealed Teflon® chamber in an autoclave under hydrothermal reaction at 180° C. for 12 hours. After cooling to room temperature naturally, the suspension was centrifuged and rinsed with water three times. The product was collected and dried in a vacuum at 60° C. overnight. The as-prepared material was ground to a powder in an agate mortar.

Nanodots were dropcast by dispersing 10 mg of the catalyst powder into a solution containing 480 μL water, 480 μL absolute ethanol ($C_2H_5OH$ Chem-Supply) and 40 μL Nafion® (5% Sigma) binding agent and the suspension was sonicated in an ice water bath for 1 hour.

The homogenous suspension was (2 μL) dropcast onto nickel foam (NF) substrate and dried in a fumehood overnight. The mass loading was 2 mg/cm$^2$.

The nanodots electrode was used in the OER in 1 M KOH solution. The results are shown in FIG. 19. The ternary composite nanodots performed better than a commercial IrC catalyst and better than a CoFe binary catalyst.

Nanodots formed from CoFeCr composite LDH are shown in FIG. 20.

The invention claimed is:

1. A layered double hydroxide material comprising a metal composite comprising cobalt, iron and chromium species interspersed with a hydroxide layer.

2. The layered double hydroxide material of claim 1, wherein the metal composite comprises $Co^{2+}$ and/or $Co^{3+}$.

3. The layered double hydroxide material of claim 1, wherein the metal composite comprises $Fe^{2+}$ and/or $Fe^{3+}$.

4. The layered double hydroxide material of claim 1, wherein the metal composite comprises $Cr^{3+}$ and/or $Cr^{6+}$.

5. The layered double hydroxide material of claim 1, wherein the metal composite comprises cobalt and iron in a ratio of 1.5 to 3.5 :1 cobalt:iron on a weight for weight basis.

6. The layered double hydroxide material of claim 1, wherein the metal composite possesses a spherical morphology.

7. The layered double hydroxide material of claim 6, wherein the spherical morphology comprises a plurality of microspheres.

8. The layered double hydroxide material of claim 7, wherein the average diameter of the microspheres is monodisperse.

9. The layered double hydroxide material of claim 8, wherein the monodisperse microspheres have an average diameter of about 100 to about 300 nm.

10. The layered double hydroxide material of claim 1, wherein the hydroxide layer is a mixed phase of amorphous hydroxide and Co based spinel oxides.

11. The layered double hydroxide material of claim 1, wherein the metal composite further comprises a nickel species.

12. A catalytic material comprising the layered double hydroxide material of claim 1 and optionally a substrate.

13. The catalytic material of claim 12, wherein the catalytic material is in the form of nanodots.

14. An electrode comprising a conductive substrate and a catalytic material coated onto a surface of the conductive substrate, the catalytic material comprising the layered double hydroxide material of claim 1.

15. The electrode of claim 14, wherein the conductive substrate is a metal foam.

16. A process for preparing the catalytic material of claim 12, the process comprising contacting a conductive substrate with a solution comprising cobalt, iron and chromium ions, and applying a voltage across the substrate and a counter electrode through the solution to electrodeposit a composite material comprising cobalt, iron and chromium species on the substrate.

17. A process for preparing the catalytic material of claim 12, comprising treating a solution of cobalt ions, iron ions and chromium ions to a temperature between about 150° C. and about 220° C. for between about 8 to about 20 hours, cooling the mixture and collecting the product.

18. A method of evolving oxygen from water, the method comprising providing an electrochemical cell comprising an anode, a cathode and an electrolyte solution, contacting water with the anode and the cathode, and applying a voltage across the anode and the cathode, wherein the anode comprises the layered double hydroxide material of claim 1.

19. The method of claim 18, wherein the anodic voltage provides an overpotential of about 200 mV to about 500 mV.

20. An electrolyser comprising an anode, a cathode and a power supply, wherein the anode comprises the layered double hydroxide material of claim 1.

* * * * *